(12) United States Patent
Brier et al.

(10) Patent No.: US 8,614,004 B2
(45) Date of Patent: Dec. 24, 2013

(54) TWO-TONE PAINT APPLICATION

(75) Inventors: Duane A. Brier, Swartz Creek, MI (US); Patrick J. McKernan, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2621 days.

(21) Appl. No.: 11/407,846

(22) Filed: Apr. 20, 2006

(65) Prior Publication Data

US 2007/0248830 A1   Oct. 25, 2007

(51) Int. Cl.
  *B32B 7/02* (2006.01)
  *B05D 5/06* (2006.01)

(52) U.S. Cl.
  USPC ........... 428/457; 427/259; 427/162; 427/261; 148/253

(58) Field of Classification Search
  USPC .......................................... 427/259, 162, 261
  See application file for complete search history.

(56) References Cited

U.S. PATENT DOCUMENTS

| | | | |
|---|---|---|---|
| 2004/0063846 A1* | 4/2004 | Lettmann et al. | 524/523 |
| 2004/0175551 A1* | 9/2004 | Dunlop et al. | 428/212 |
| 2006/0045965 A1* | 3/2006 | Lin | 427/162 |

* cited by examiner

*Primary Examiner* — Rebecca Lee

(57) ABSTRACT

The invention concerns a two-tone paint application having a first base color in a first color area, a second base color in a second color area, and two layers of clear coat such that the transition between the two color areas is smooth surface.

15 Claims, 3 Drawing Sheets

# TWO-TONE PAINT APPLICATION

BACKGROUND OF INVENTION

The present invention relates generally to a painting process, and in particular to a painting process employed to produce a two-tone paint scheme.

Many times, for aesthetic reasons, consumer goods, and in particular, vehicles, are painted to produce a two-tone paint job; that is, a product that is painted with different colors on various surfaces. For vehicles, this may be a color arrangement where a top portion of the vehicle is a first color and the bottom portion of the vehicle is a second color.

While the two-tone appearance may be aesthetically pleasing, there are drawbacks in that, due to the application process used to spray on two different colors of paint, a ridge tends to be formed at the color transition line. While trim can be employed along the color transition line to hide this ridge, it is not always desirable for aesthetic and/or cost reasons to use trim there.

It is desirable, therefore, to provide a two-tone paint application, in particular for a vehicle, with a smooth surface along the transition between the different colors.

SUMMARY OF INVENTION

An embodiment contemplates a method of producing a two-tone paint application on a surface comprising the steps of: initially preparing the surface in a first color area and a second color area; applying a first base coat for a first color in the first color area; applying a first clear coat over the first base coat in the first color area and over the second color area; applying a second base coat for a second color in the second color area; and applying a second clear coat over the first clear coat in the first color area and over the second base coat in the second color area.

An embodiment contemplates a method of producing a two-tone paint application, on a vehicle surface, having a smooth color transition line surface between a first and a second color area on the vehicle surface, the method comprising the steps of: applying a first base coat for a first color in the first color area; applying a first clear coat over the first base coat in the first color area and over the second color area; masking the first color area; applying a second base coat for a second color in the second color area; removing the masking after allowing the second base coat to flash long enough to skin over; and applying a second clear coat over the first clear coat in the first color area and over the second base coat in the second color area.

An embodiment contemplates a two-tone paint application, on a vehicle surface, having a smooth color transition line surface between a first and a second color area on the vehicle surface. The two-tone paint application may include a corrosion resistance coating on the first and second color areas, a first base coat, having a first color, covering the corrosion resistance coating in the first color area, and a first clear coat covering the first base coat in the first color area and the corrosion resistance coating in the second color area. A second base coat, having a second color, covers the first clear coat in the second color area, and a second clear coat covers the first clear coat in the first color area and the second base coat in the second color area.

An advantage of an embodiment is that any ridge that may be formed as a result of the masking process is filled in by the second clear coat layer, leaving a smooth surface along the transition between the colors.

DETAILED DESCRIPTION

Figure 1:
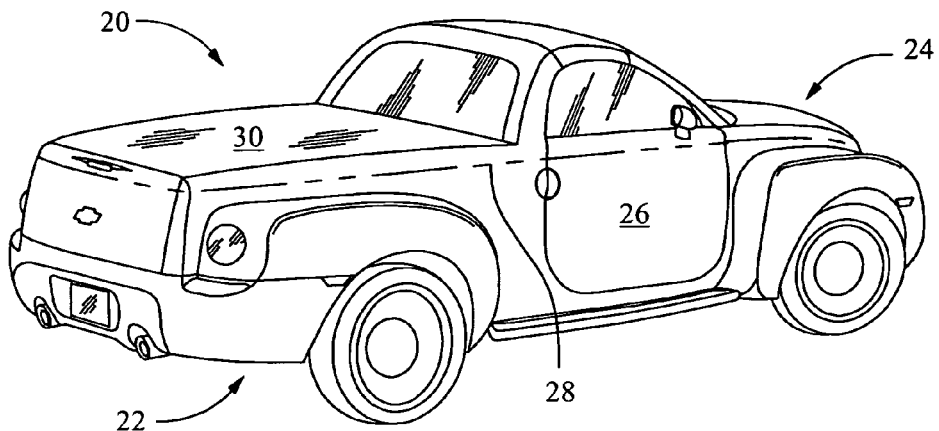
FIG. 1 is a perspective view of a vehicle with a two-tone paint application.

FIG. 1 illustrates a vehicle 20 having a body 22 with an exterior surface 24 that has undergone a two-tone paint application process. The surface 24 has a first color area 26 (located below a color transition line 28, which is indicated by the phantom line) and a second color area 30 (located above the color transition line 28). The first and second color areas 26, 30 may be, for example, grey and black, respectively. Of course, the color transition line 28 may be located and oriented anywhere desired on the vehicle, and the two color choices may be any desired colors. Also, while one first color area 26 and one second color area 30 are discussed herein (for the example of a two-tone application on the vehicle 20), there may be multiple first and second color areas on a vehicle if so desired.

Figure 7:
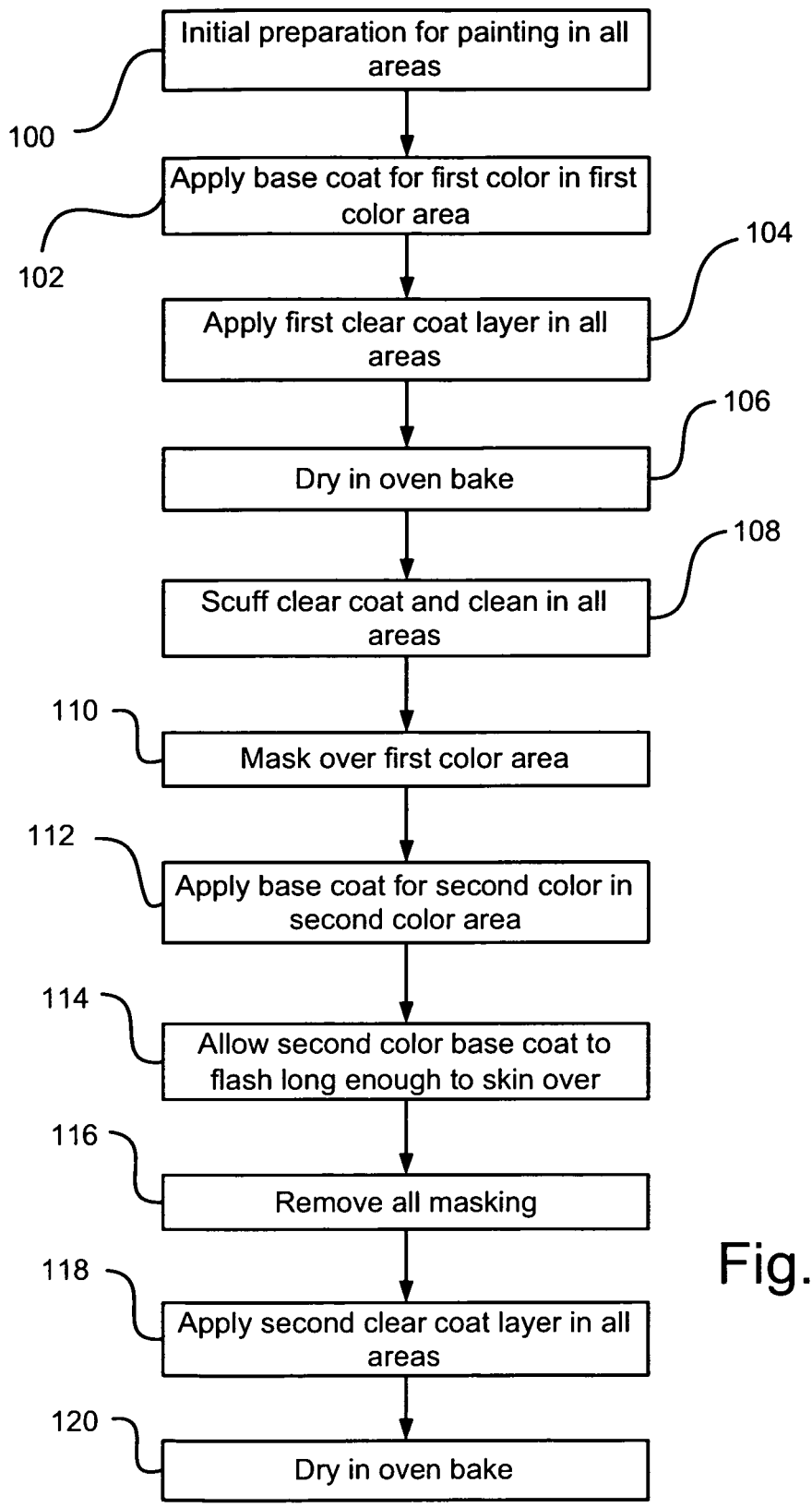
FIG. 7 is a flow chart illustrating a two-tone paint application process.

The process for creating the two-tone paint application on the vehicle 20 of FIG. 1 will now be discussed relative to FIG. 7, in conjunction with FIGS. 2-6. It should be noted that FIGS. 2-6 are schematic, so the relative thicknesses of the layers do not represent actual relative thicknesses between the layers—they are illustrated for ease and clarity in discussing this application process.

Figure 2:
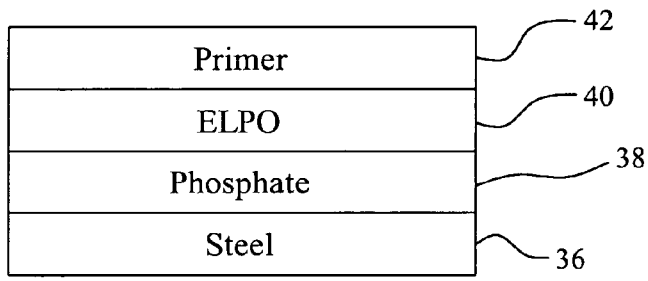
FIG. 2 is a schematic view of a component having undergone a portion of a paint application process.

A process for creating the two-tone paint application over a portion 36 of the vehicle body 22 may begin with an initial preparation, step 100, resulting in the coatings shown in FIG. 2. This initial preparation may include the portion 36 of the vehicle body 22—which may be made of, for example, steel—being degreased, cleaned and phosphate treated 38 for corrosion protection. An electrolytic paint operation (ELPO) may be employed to add another anti-corrosion layer 40, and may be dried by baking in a paint oven (not shown). One or more coatings of primer 42 may be applied over the ELPO and baked in a paint oven to dry. Also, a moist sand system may be used on the primer 42 to finish the initial preparations for painting. The activities occurring in step 100 may be conventional if so desired and so will not be discussed in more detail herein.

Figure 3:
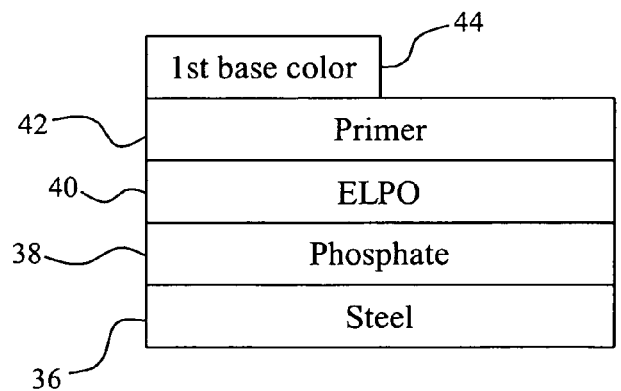
FIG. 3 is a schematic view of the component having undergone another step in the paint application process.
Figure 4:
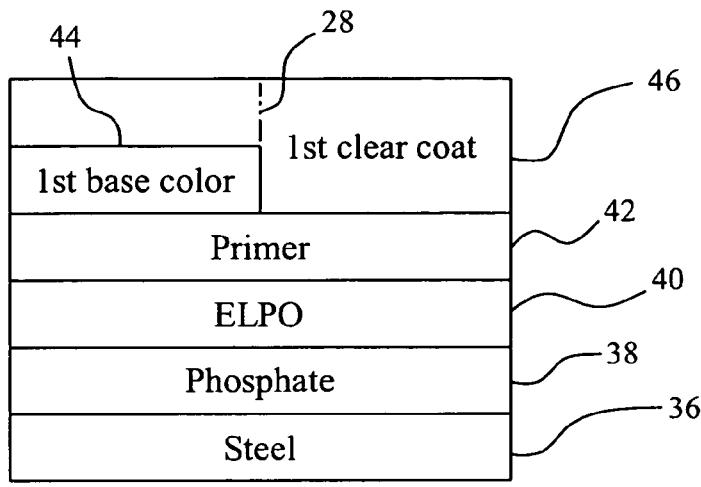
FIG. 4 is a schematic view of the component having undergone another step in the paint application process.
Figure 5:
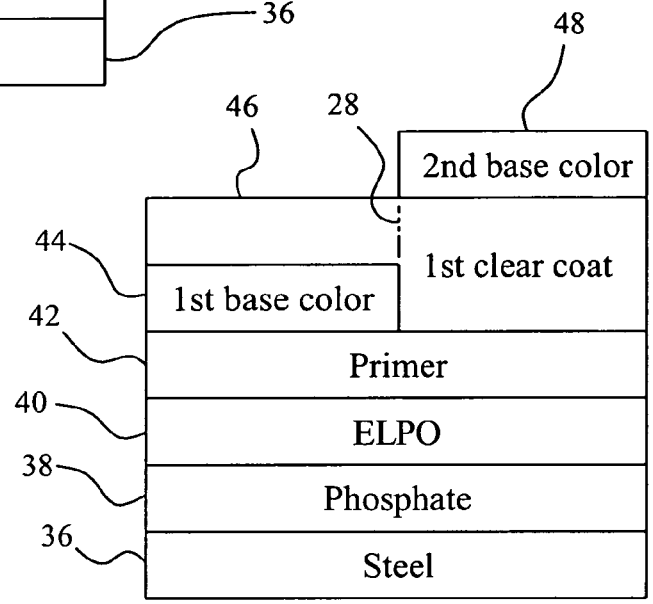
FIG. 5 is a schematic view of the component having undergone another step in the paint application process.
Figure 6:
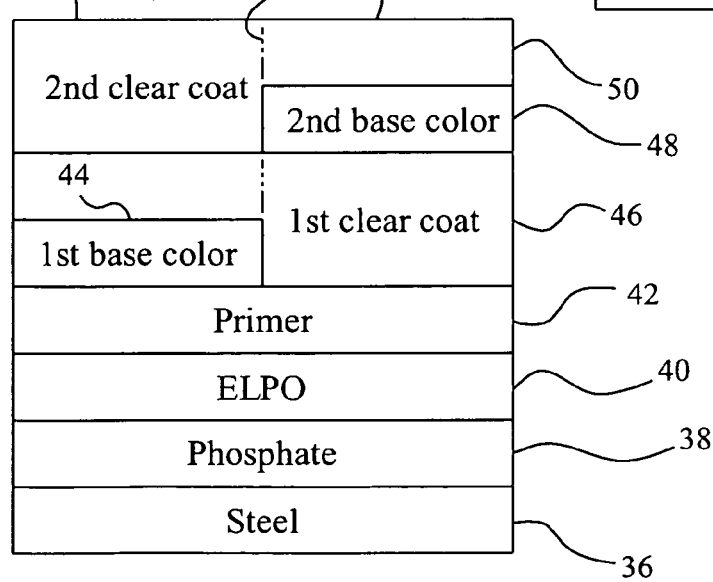
FIG. 6 is a schematic view of the component having completed the paint application process.

A base coat 44 for a first base color is applied to the first color area 26, step 102, resulting in the coatings shown in FIG. 3. A first clear coat layer 46 is applied to both the first and second color areas 26, 30, step 104, resulting in the coatings shown in FIG. 4. The coatings are dried by baking in a paint oven (not shown), step 106. The steps involving a paint oven will not be described in more detail herein since this can be a conventional paint oven known to those skilled in the art. The clearcoat 46 is then scuffed (to promote adhesion of additional layers) and cleaned of any sanding residue, step 108.

Masking is applied to the first color area 26, step 110. A base coat 48 for a second base color is applied to the second color area 30, step 112, resulting in the coatings shown in FIG. 5. Once the base coat 48 for the second base color has flashed long enough to skin over, step 114, all of the masking is removed, step 116. A second clear coat layer 50 is applied to both the first and second color areas 26, 30, step 118, resulting in the coatings shown in FIG. 6. The second clear coat layer 50 is preferably applied relatively soon after the masking is removed rather than drying first in a paint oven or otherwise. After the second clear coat layer 50 is applied, the body 22 is again baked in a paint oven, step 120. The result is that the exterior surface 24 is smooth, even along the color transition line 28 between the first color area 26 and the second color area 30 for the two-tone paint application.

While certain embodiments of the present invention have been described in detail, those familiar with the art to which this invention relates will recognize various alternative designs and embodiments for practicing the invention as defined by the following claims.

What is claimed is:

1. A method of producing a two tone paint application on a surface comprising the steps of:
    (a) initially preparing the surface in a first color area and a second color area;
    (b) applying a first base coat for a first color in the first color area;
    (c) applying a first clear coat over the first base coat in the first color area and over the second color area;
    (d) applying a second base coat for a second color in the second color area, and masking the first color area prior to applying the second base coat, allowing the second base coat to flash long enough to skin over, and removing the masking after the second base coat has skinned over; and
    (e) applying a second clear coat over the first clear coat in the first color area and over the second base coat in the second color area.

2. The method of claim 1 wherein step (e) is further defined by applying the second clear coat immediately after removing the masking.

3. The method of claim 1 wherein step (c) is further defined by drying the first clearcoat, and then scuffing the first clearcoat prior to step (d).

4. The method of claim 1 wherein step (e) is further defined by drying in a paint oven bake after applying the second clear coat.

5. The method of claim 1 wherein step (c) is further defined by drying the first clearcoat in a paint oven bake, and then scuffing the first clearcoat prior to step (d).

6. The method of claim 5 wherein step (e) is further defined by drying in a paint oven bake after applying the second clear coat.

7. The method of claim 1 wherein step (a) is further defined by applying a phosphate treatment to the surface.

8. The method of claim 7 wherein step (a) is further defined by applying an electrolytic paint operation to the phosphate treatment.

9. The method of claim 1 wherein the surface is a vehicle exterior surface and the first color area and the second color area are areas on the vehicle exterior surface.

10. A method of producing a two tone paint application, on a vehicle surface, having a smooth color transition line surface between a first and a second color area on the vehicle surface, the method comprising the steps of:
    (a) applying a first base coat for a first color in the first color area;
    (b) applying a first clear coat over the first base coat in the first color area and over the second color area;
    (c) masking the first color area;
    (d) applying a second base coat for a second color in the second color area;
    (e) removing the masking after allowing the second base coat to flash long enough to skin over; and
    (f) applying a second clear coat over the first clear coat in the first color area and over the second base coat in the second color area.

11. The method of claim 10 wherein step (f) is further defined by applying the second clear coat immediately after removing the masking.

12. The method of claim 10 wherein step (b) is further defined by drying the first clearcoat in a paint oven bake, and then scuffing the first clearcoat prior to step (d).

13. The method of claim 10 wherein step (f) is further defined by drying in a paint oven bake after applying the second clear coat.

14. The method of claim 10 further including the step of applying a phosphate treatment to the vehicle surface prior to step (a).

15. The method of claim 14 further including applying an electrolytic paint operation to the phosphate treatment prior to step (a).

* * * * *